Patented Aug. 6, 1946

2,405,309

UNITED STATES PATENT OFFICE 2,405,309

SYSTEM OF CONTROL FOR SUPERCHARGED ENGINES

Clarence H. Jorgensen and Edward M. Claytor, Anderson, Ind., assignors to General Motors Corporation, Detroit, Mich., a corporation of Delaware Application August 30, 1943, Serial No. 500,548

16 Claims. (Cl. 60—13)

This invention relates to the control of the intake pressure of an aviation, internal combustion engine having a supercharger driven by an exhaust gas turbine.

It is an object of the present invention to provide a control system which will automatically maintain a preselected intake pressure over a wide altitude range. In general the system provides the following control; during flight in the lower range of altitudes the turbine operates at a minimum speed to provide for the maintenance of the selected pressure, the throttle being opened automatically as the altitude increases; and when the altitude increases above that where wide open throttle is required to maintain the selected pressure with low speed turbine operation, the closing of a waste gate which controls flow through the engine exhaust gas pipe is effected automatically to increase the turbine speed to an extent such that the selected intake pressure will be maintained throughout a higher altitude range, the limit being the altitude at which the turbine reaches maximum governed speed.

More specifically, the present system comprises speed responsive means for determining the minimum and maximum speed of the turbine, an automatic throttle valve regulator which so positions the throttle valve that a selected pressure will be maintained with increasing altitude until the altitude exceeds that at which wide open throttle is required to maintain the pressure selected, and means rendered operative by movement of the throttle to wide open position for effecting increase of turbine speed from minimum to maximum in order to maintain the selected pressure as the altitude increases after the throttle has been fully opened. The system is under the control of a manually operated main control lever which is operated by the pilot to select the pressure to be maintained. The system includes a reversible electric motor for moving the exhaust waste gate, motor controlling means adjusted to the selection of pressure by the main control lever and responsive to engine intake pressure, and means responsive to movement of the throttle valve by the regulator to wide open position for rendering the motor control means effective to cause the motor to move the waste gate toward closed position and thus to increase the speed of the turbine to an extent sufficient to maintain the required pressure after full opening of the throttle valve.

A further object of the present invention is to control the operation of the waste gate motor that overtravel of the motor is substantially eliminated. To accomplish this object, the circuit connection between the motor and current source is so controlled that, when a correction of the waste gate position is demanded, the rate of accumulation of motion of the motor is initially relatively great; and, as the correction is made, the rate diminishes. This circuit connection is provided by a variably-intermittent circuit closer comprising tapered contacts insulatingly carried by a rotary drum driven by a separate electric motor at a constant speed which determines the frequency of the circuit making periods. The tapered contacts are engaged by a contact movable longitudinally of the drum by means responsive to engine intake pressure. The duration of a circuit making period varies according to the difference between the actual pressure and the pressure called for. When this difference is relatively great, the duration is great; and when small, the duration is small. Therefore, when a change of waste gate position is required to meet a differential between actual intake pressure and pressure called for, the rate of accumulation of motion of the motor is initially great in order that a substantial portion of the corrective movement of the waste-gate may be accomplished in a relatively short time. As the waste gate nears its position of balance or equilibrium and the pressure differential approaches zero, the rate of accumulation of motion of the motor decreases substantially so that, by the time the equilibrium position of the waste-gate has been reached, the motor stops. Thus overtravel of the waste-gate is prevented and "hunting" is avoided. This control is effective whether the pressure differential is great or small as controlled by a great or small movement of the main control lever which changes the pressure selection, or whether the pressure selection remains fixed and the pressure differential occurs by reason of change in altitude.

A further object is to effect the correction of waste gate position in the minimum time without hunting when an abrupt increase of pressure selection has been made by the main control lever independently of the magnitude of pressure selection. To accomplish this object, the variably-intermittent circuit maker is by-passed by a switch which is biased normally open by a spring and which is closed by the main control lever through a pneumatic motion transmitter having a vent sufficiently large to prevent the normal, relatively slow movements of the lever being transmitted to the switch, but small enough to effect closing of the switch for a brief interval less than the total time required for correction so that control of the motor is returned to the variably-intermittent circuit controller in time for the diminution of motor-circuit-making impulses to take place. Thus quick correction of waste gate position is effected initially by continuous operation of the motor followed by intermittent operation with diminishing R. P. M. until the motor stops with the waste-gate in balanced position.

A further object of the invention is to provide also for the control of the waste gate operating motor by means responsive to predetermined minimum and maximum speeds in order that, before the throttle valve has been fully opened by the regulator, the speed of the turbine will not fall below a certain low value, and in order that, after the throttle valve has been fully opened by the regulator, the speed of the turbine will not be caused to exceed a certain maximum. Consequently, the system provides a speed responsive governor for controlling the waste gate motor to maintain a predetermined minimum turbine speed while the throttle is in a position other than wide open. When the throttle attains wide open position, the control of the waste gate motor is taken away from the minimum speed governor and the intake-pressure-responsive means operates gradually to increase the turbine speed as altitude increases whereby a selected pressure is maintained during ascent to altitudes exceeding that which is critical for the selected pressure with minimum speed turbine operation. When the maximum allowed turbine speed is reached, the control of the waste-gate motor is taken away from the intake pressure responsive means and is transferred to a speed responsive device which causes the waste gate motor to function to maintain the waste gate at such position that the maximum allowed speed of the turbine will not be exceeded. Conversely during descent, when the speed of the turbine falls a certain amount below the maximum governed speed, the control of the waste-gate motor is transferred back to the intake pressure responsive means which gradually reduces the turbine speed to the minimum which is reached when the throttle valve begins to close. Then the control of the waste gate motor is taken over by the minimum speed governor.

Further objects and advantages of the present invention will be apparent from the following description, reference being had to the accompanying drawings wherein a preferred embodiment of the present invention is clearly shown.

Figure 1:
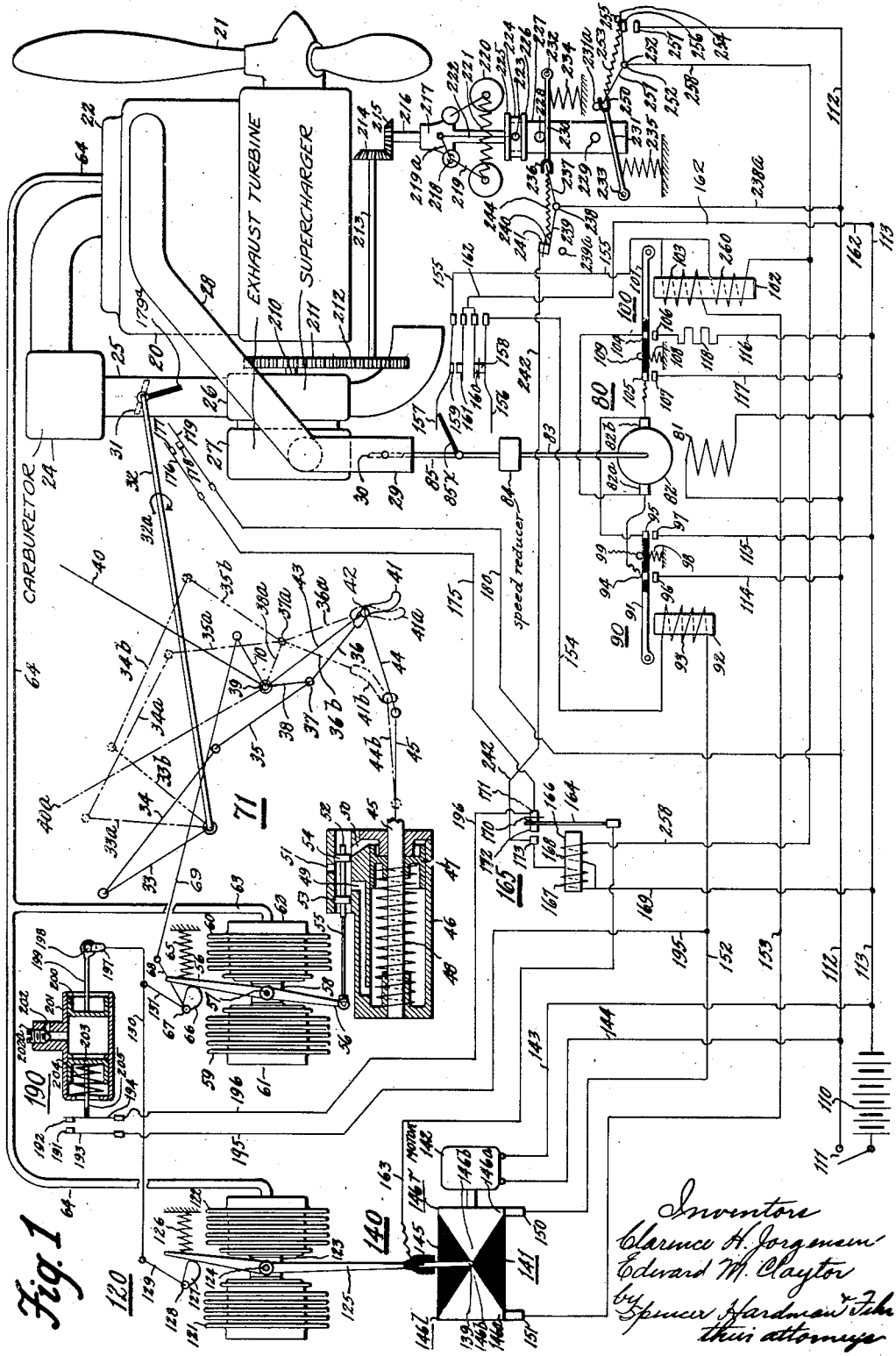
Fig. 1 is a diagram of a system of control embodying the present invention.

There is an engine 20 driving a propeller 21 and having an intake manifold 22 connected with a carburetor 24 the inlet pipe 25 of which is connected with the outlet of an auxiliary supercharger 26 driven by an exhaust turbine 27 connected with the engine exhaust pipe 28 which has an outlet 29 controlled by a waste gate 30. The pipe 25 contains a throttle valve 31 rotated by a shaft 32 carrying an arm 33 connected by a link 34 with an arm 35 of a lever having also an arm 36 and a floating fulcrum 37 carried by a lever arm 38 connected with a shaft 39 which is turned by a main control lever 40 which is positioned by the pilot's control lever, not shown. The lower end of lever 36 provides a cam slot 41 for receiving a roller 42 carried by the lower end of an idling lever 43 loosely journalled on shaft 39. Roller 42 is connected by a link 44 with a piston rod 45 of an hydraulic servo-motor comprising a cylinder 46 and a piston 47 attached to the rod 45. A spring 48 normally maintains the piston in the right position shown in the drawings. The cylinder 46 is provided with ports 49 and 50 either of which may be placed in communication with a pressure fluid inlet 51 by a valve 52 having lands 53 and 54 and connected by a rod 55 with a lever 56 pivoted at 57 on a bridge 58 connecting the free ends of metal bellows 59 and 60 having fixed ends 61 and 62 respectively. Bellows 59 is evacuated. Bellows 60 is connected by pipes 63 and 64 with engine intake manifold 22. Bellows 59 and 60 contain springs so constructed and calibrated that the relation of motion of the pivot 57 to changes in intake pressure is substantially a linear relation. The upper end of the lever is urged by a spring 65 against a datum or pressure selecting cam 66 secured to a shaft 67 carrying an arm 68 connected by a link 69 with an arm 70 attached to shaft 39 and operated by main control lever 40.

The parts numbered 32 through 70 make up the controller 71 together with its connections to the throttle 31 and with the intake manifold 22. This controller is the type shown in the copending application of Jorgensen and Taylor Serial No. 433,438 filed April 17, 1943, which discloses the controller in greater detail. This controller operates in the following manner: when it is desired to ascend from ground level the lever 40 is moved to 40a, for example. Lever 38 moves to 38a and pivot 37 to 37a. Arm 35 moves to 35a. Arm 36 moves to 36a and cam slot 41 moves to 41a, while roller 42 remains stationary. Link 34 moves to 34a and arm 33 to 33a and shaft 32 moves in the direction of arrow 32a, thereby causing throttle 31 to move to a partly open position. As lever 40 is moved to 40a, arm 70, link 69 and arm 68 move toward the left to cause the datum cam 66 to rotate counterclockwise, thereby permitting spring 65 to move lever 56 counterclockwise, in order to move the valve 52 to the right so as to cause the land 53 to cover the port 49 and the land 54 to move to the right of the port 50, thereby placing port 50 in communication with fluid pressure inlet port 51. Piston 47 moves left to cause arm 36 to move to the position 36b and arm 35 to move toward 35b, link 34 to move toward 34b and arm 33 to move toward 33b, thereby causing further clockwise rotation of the valve 31. As valve 31 opens, the pressure in intake 22 increases and likewise in bellows 60 which expands to cause pivot 57 to move left and likewise the valve 52. The preselected pressure is obtained when the bellows 60 has expanded sufficiently to cause the lands of valve 52 to close both ports 50 and 49. As altitude increases, the controller 71 operates to increase the opening of throttle 31. When an altitude is attained such that the throttle 31 is moved the fullest extent by the regulator, that altitude is known as the critical altitude for a particular pressure selection. The stroke of the piston rod 45 and the shape of the cam slot 41 are such that, over a wide range of pressure selections, the throttle valve 31 will be moved by the regulator to wide open position at critical altitude.

If the speed of the auxiliary turbine were not increased, the intake pressure would decrease rapidly as altitude is increased. Therefore, means are provided for increasing the speed of the turbine as the altitude is increased above the altitude which is critical for a selected pressure with the turbine operating at minimum speed. The turbine speed is increased by moving the waste gate 30 toward closed position. The waste gate is controlled by an electric motor 80 having a shunt field 81 and an armature 82 which drives a shaft 83 connected by a speed reducing gearing 84 with a shaft 85 connected with the gate 30. The direction of rotation of the shafts 83 and 85 is determined by the direction of current flow through the motor armature 82.

The direction of rotation of the motor armature 82 is controlled by relays 90 and 100. Relay 90 comprises an armature 91 cooperating with a core 92 surrounded by a magnet coil 93. Armature 91 insulatingly supports contacts 94 and 95 adapted respectively to engage contacts 96 and 97. A spring 98 urges the armature upwardly against a stop 99. Likewise, the relay 100 has an armature 101 cooperating with a core 102 surrounded by a magnet coil 103 and insulatingly supporting contacts 104 and 105 adapted respectively to engage contacts 106 and 107. A spring 108 urges armature 101 upwardly against a stop 109.

A battery 110 is connectible by a switch 111 with wires 112 and 113. Contacts 96 and 97 are connected with wires 112 and 113 by wires 114 and 115 respectively. Contacts 106 and 107 are connected with wires 113 and 112 by wires 116 and 117 respectively, there being a resistance 118 between wire 116 and contact 106. Motor brush 82a is connected with contacts 94 and 104 and motor brush 82b is connected with contacts 95 and 105. When coil 93 is energized, armature 91 moves down to cause current to flow through armature 82 in such direction as to cause the waste gate 30 to move toward closed position or clockwise in the drawings. When coil 103 is energized, the armature 101 moves down to cause current to flow through the armature 82 in such direction as to cause the waste gate to move toward open position or counterclockwise in the drawings.

The relay coils 93 and 103 are controlled by a variable intermittent switch 140 which is controlled by a pressure responsive device 120 which comprises a pair of bellows 121 and 122 corresponding to the bellows 59 and 60 of controller 71. Bellows 121 is evacuated and bellows 122 is connected by pipe 64 with intake 22. The free ends of bellows 121 and 122 are connected by a bridge 123 carrying a pivot 124. The bellows contains springs so constructed and calibrated that the relation between movements of pivot 124 and changes in intake pressure is a linear relation. Pivot 124 supports a lever 125, the upper end of which is urged by a spring 126 against a datum or pressure selecting cam 127 mounted on a shaft 128 connected by an arm 129 and a link 130 and an arm 131 with the shaft 67 of the datum cam 66 of the controller 71. Therefore, when lever 40 is moved, cam 127 is moved in a coordinated relation with respect to datum cam 66 so that the device 120 will be set to effect a predetermined pressure control just as the cam 66 causes the controller 71 to effect a predetermined pressure control. Lever 125 insulatingly supports a switch contact blade 139 of a variable contact, intermittent switch 140 said blade being engageable with a drum 141 rotated at a constant predetermined speed by an electric motor 142 connected by wires 143 and 144, with wires 113 and 112 respectively. The drum 141 comprises nonconducting portions 145 and contacts 146r and 146l which are mitre-like in shape, that is, each of these contacts has a continuous cylindrical band portion 146a and two diametrically opposite triangular portions 146b extending therefrom. When the blade 139 is in the central or neutral position shown, which results from equalization of intake pressure and selected pressure, both contacts 146r and 146l are engaged and motor 80 does not operate. A difference between intake pressure and selected pressure causes the blade 139 to move into engagement with one or the other of these contacts. The greater this difference, the further the blade 139 is moved from neutral position, and the greater is the proportion of one revolution of the drum 141 that the blade 139 engages one of these contacts. The continuous band portions 146a are engaged respectively by brushes 150 and 151 connected, respectively, by wires 152 and 153 with relay coils 93 and 103 which are connected, respectively, by wires 154 and 155 with limit switch blades 156 and 157 carrying contacts 158 and 159, respectively, engageable with contacts 160 and 161, respectively, which are connected together by a wire 162 with wire 113. The blade 139 is connected by a wire 163 with the armature 164 of a transfer relay 165 having a core 166 surrounded by coils 167 and 168 connected together by wire 169 with wire 113. When the relay 165 is not energized by connecting either of its coils 167 or 168 with the battery 110, the armature 164 remains in the position shown with contact 170 carried thereby engaging a contact 171. When the relay 165 is energized, contact 170 is separated from contact 171 and the contact 172 is brought into engagement with the contact 173. Contact 171 is connected by wire 175 with a switch blade 176 carrying a contact 177 engageable by a contact 178 carried by a blade 179 connected by wire 180 with wire 112. When the throttle 31 is wide open, an arm 179a on shaft 32 engages blade 179 to move contact 178 into engagement with contact 177. This establishes the control of the motor controlling relays 93 and 103, by the device 120 which controls the intermittent switch 140.

When the blade 139 of intermittent switch 140 is in a position engaging the contact 146l, relay 103 is energized to cause the motor 80 to operate to open the waste gate 30 to decrease the turbine speed. When the blade 139 engages the contact 146r, relay 93 is energized to cause the motor 80 to operate to close the waste gate to increase turbine speed.

The apices of the triangular portions 146b of mitre-like contacts 146l and 146r are so closely spaced that blade 139 may touch both contacts when in balanced position. Fig. 2 shows means for preventing operation of more than one relay (90 or 100) at a time thus preventing short circuit of the battery 110. Wire 154 in the circuit of relay magnet coil 93 of relay 90 (Fig. 1) is intercepted by a switch (Fig. 2) having fixed contacts 154a and 154c normally bridged by a movable contact 154b insulatingly supported by armature 101 of relay 100. Wire 154d leads to limit switch contact 158. When relay 100 is energized, this switch opens to open circuit relay magnet coil 93, and relay 90 cannot be energized. Wire 155 in the circuit of relay magnet coils 103 and 260 of relay 100 (Fig. 1) is intercepted by a switch (Fig. 2) having fixed contacts 155a and 155c normally bridged by a contact 155b insulatingly supported by armature 91 of relay 90. Wire 155d leads to limit switch contact 159. When relay 90 is energized, this switch opens to open circuit relay magnet coils 103, 260, and relay 100 cannot be energized. Therefore while blade 139 is only on contact 146*l* of switch 140, only relay 100 is energized. As the blade 139 engages contact 146*r* while leaving contact 146*l*, only relay 100 is energized. Blade 139 must entirely leave contact 146*l* before relay 100 will be deenergized and then only relay 90 will be energized.

When the lever 40 is moved to 40*a*, for example, the controller 71 operates to open the throttle 31 with increasing altitude in order to maintain the predetermined pressure selected by the operation of the cam 66. As stated before, when cam 66 moves counterclockwise, the lever 56 moves counterclockwise to cause the valve 52 to move right and the piston 47 to move left. At the same time, the cam 127 of the device 120 moves counterclockwise to allow the spring 126 to move the lever 125 counterclockwise and to move contact 139 to engagement with segment 146*r*. Before throttle 31 is wide open nothing happens, because the switch contacts 178, 177 are not then closed. But, when that altitude is reached which is critical for the selected pressure with turbine operating at minimum speed, the throttle reaches fully open position and switch contacts 177 and 178 are closed, whereupon the device 120 becomes operative to take over control of the waste gate operating motor 80. When the pressure starts to drop after the throttle 31 has been moved to wide open position by the controller 71, bellows 122 of the device 120 starts to collapse to pull the blade 139 into engagement with the contact 146*r* and out of engagement with the contact 146*l*. Therefore, the switch contacts 177, 178 being closed, the relay 90 operates to cause the waste gate 30 to move toward closed position thereby increasing the speed of the turbine and thereby increasing the intake pressure whereupon the bellows 122 expands to move the blade 139 to mid-position whereupon the motor 80 stops. As the altitude increases, the device 120 so controls the motor 80 that the closing movement of the waste gate increases and the turbine speed increases, thus maintaining the selected intake pressure at a high altitude, which is the critical altitude when the speed of the turbine attains a maximum governed speed. The prevention of overspeeding of the turbine will be described later.

Figure 2:
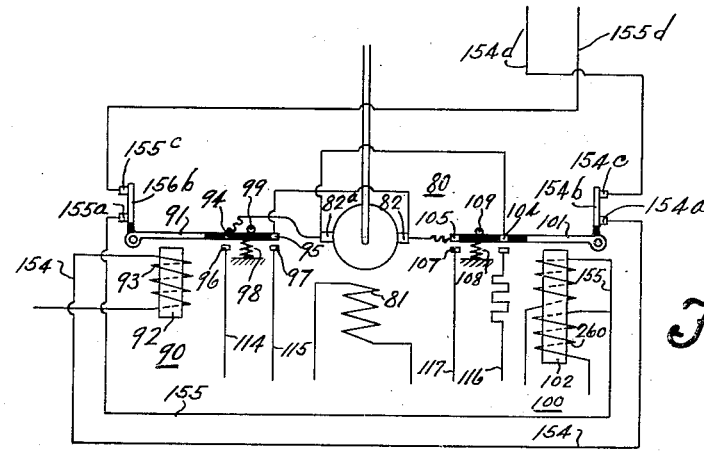
Fig. 2 is a wiring diagram supplementing Fig. 1 and showing means to open-circuit either one of the waste-gate-motor relays when the other relay is energized.
Figure 3:
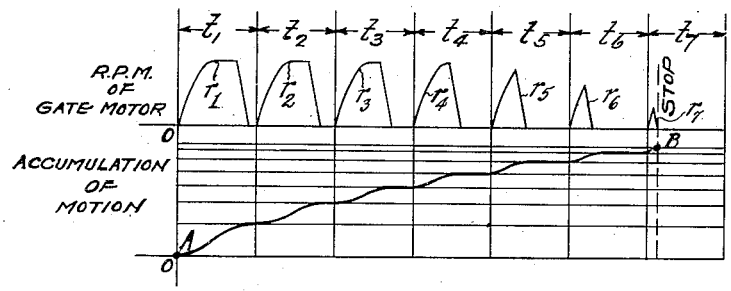
Figs. 3, 4 and 5 are diagrams showing the operation of the waste-gate motor under different conditions.

The idling position of lever 40 is shown in full lines in Fig. 1. The position for highest pressure selection is shown at 40*a*. There are intermediate positions for take-off and cruising. When lever 40 is moved at a normal, relatively slow rate to make a pressure selection, the control apparatus operates as shown diagrammatically by Fig. 3. Suppose, for example, that an increase in pressure selection is made thereby causing cam 127 to rotate counterclockwise to permit spring 126 to move contact 139 to the right to engage the wider parts of contacts 146*r*. During time increment $t_1$, (Fig. 3), the current received by the motor endures long enough to cause the motor R. P. M. to be that represented by curve $r_1$, which is typical of the initial operation of the motor when starting to make a correction of waste-gate position. The waste-gate 30 begins to close, the speed of the turbine 27 and of the supercharger increases and intake pressure increases. Bellows 122 expands thereby causing lever 125 and contact 139 to move toward central neutral position. During each succeeding time increment, represented in Fig. 3 by $t_2$ to $t_7$, the period of circuit-making between the battery 110 and the motor 80, as contact 139 engages a contact 146*r*, diminishes in value. Therefore the total R. P. M. of motor 80 occurring during each time increment decreases, as represented by $r_2$ to $r_7$. Therefore the rate of accumulation of motion of the motor 80 decreases as contact 139 approaches central position, as represented by line A—B in Fig. 3, said movement of the contact 139 being consequent to and concurrent with the correction of waste-gate position as effected by the motor. Since the rate of accumulation of motion of the motor 80 decreases substantially as the waste-gate nears its corrected position, the motor does not overthrow the waste-gate but stops practically dead when the correct position is attained. Therefore "hunting" is avoided.

Figure 4:
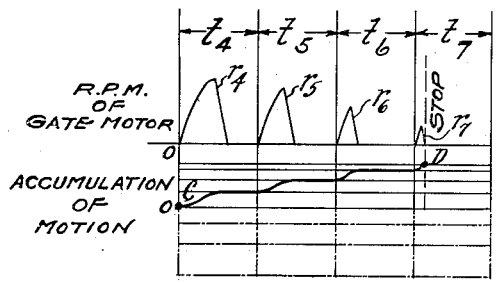

This feature is present when the control apparatus operates to effect a correction of waste-gate positions to make the intake pressure keep in step with selected pressure when altitude changes, the pressure selection remaining fixed. Fig. 4 illustrates the operation of the control apparatus under these conditions. The line C—D representing accumulation of motion of the motor 80 is similar to that part of line A—B of Fig. 3, for intervals $t_4$ to $t_7$.

The blade 139 is a motor control member which is positioned jointly by a manually adjusted pressure selecting element, cam 127, and by an intake-pressure-responsive element, bellows 122. When the intake-pressure equals the selected pressure, the blade 139 is in a central, neutral position and there is no operation of the waste-gate motor. When the intake pressure is less than the selected pressure, the blade cooperates with control apparatus which effects operation of the motor to close the waste gate in order to increase the intake pressure. When the intake pressure is greater than the selected pressure, the blade cooperates with control apparatus which effects rotation of the motor to open the waste gate in order to decrease the intake pressure. The devices with which the blade 139 cooperates include mechanism, the intermittent, variable contact switch 140, whereby the initial accumulation of motion of the waste gate motor is greater or less according as the differential between intake pressure and selected pressure is greater or less and whereby, as the correction of waste-gate position is made, the rate of accumulation of motion of the motor gradually decreases from a relatively high initial value to relatively low final value as the correction is being terminated.

In case such an emergency arises as requires the pilot to move the lever 40 suddenly toward the left to increase the pressure selection, then the intermittent variable contact switch 140 is by-passed by switch indicated at 190 comprising a pair of contacts 191, 192 mounted on blades 193 and 194 and connected by wires 195 and 196 with wire 152 and contact 171. The contacts 191, 192 are closed in response to a sudden movement of the link 130 which is operated by lever 40. Link 130 has a slot 197 which receives a pin 198 in a rod 199 attached to a dash pot piston 200 slidable in a cylinder 201 having an adjustable vent 202. When the movement of the piston 200 is abrupt, air is compressed within the cylinder 201 to an extent sufficient to cause a piston 203 to move outwardly against the action of a spring 204 and to push a rod 205 against the blade 194 to cause the contacts 191, 192 to close. This has an effect which would be produced if the blade 139 remained in contact with the continuous portion 146*a* of the right segment 146*r*.

Figure 5:
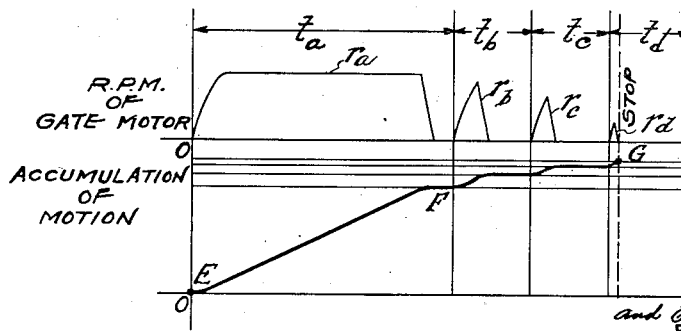

Therefore, momentarily, the relay 90 is continuously energized to cause the motor 80 to operate continuously at maximum speed to close the gate 30. The vent 202 is adjusted by the plug 202a to allow the spring 204 to move the piston 203 back relatively slowly thus permitting the contacts 191, 192 to remain in engagement sufficiently long for the motor to effect a greater part of the required movement of the gate 30 toward the closed position. Curve $r_a$ (Fig. 5) represents motor R. P. M. while the switch 140 is by-passed, and EF represents the accumulation of motor revolutions during the period of by-passing. The vent 202 is such that the duration of the period of by-passing is less than the total required for correction of waste gate position so that control of the motor can be returned to the switch 140 when contacts 191, 192 separate. Therefore there is time for a substantial reduction of the rate of accumulation of motion of the motor so that hunting will be avoided. Curve FG represents this reduction in accumulation of motion.

Resistance 118 (Fig. 1) is used when it is desired to reduce the voltage on the armature of waste-gate motor 80 and the maximum speed thereof during operation of the motor to open the waste-gate to reduce the speed of the supercharger.

The control of the turbine for minimum and maximum governed speeds will now be described. The turbine shaft 210 drives a gear 211 meshing with a gear 212 driving a shaft 213 driving a bevel gear 214 meshing with bevel gear 215 driving a shaft 216 carrying a collar 217 providing pivots 218 for arms 219 carrying flyweights 220 urged together by a spring 221. Levers 219 have their arms 219a connected by links 222 with pins 223 extending from a collar 224 occupying a groove between flanges 225 and 226 of a non-rotatable sleeve 227 which carries pins 228 and 229 for engaging levers 230 and 231, respectively, pivoted, respectively, at 232 and 233 and urged upwardly by springs 234 and 235, respectively. When the turbine is operating at low speed lever 230 engages the pin 228. Lever 230 has a non-conducting forked end 236 engaging a lever 237 pivoted at 238 connected by wire 233a with wire 112. Lever 239, pivoted at 238, carries a contact 240 engaging a contact 241 connected by a wire 242 with contact 173 of transfer relay 165. A spring 244 connects the free ends of levers 237 and 239 so as to maintain contact 240 in engagement with contact 141. The centrifugal device is so arranged that at 8000 R. P. M. turbine speed, the contacts 240 and 241 are closed. Then the coil 167 of transfer relay 165 is energized and armature 164 moves left to separate contact 170 from contact 171 so as to bring contact 172 into engagement with contact 173 thereby connecting battery line 113 with armature 164 which is connected with the blade 139 of the switch 140. Although 8000 R. P. M. is termed the idling speed of the turbine, it is sufficient to maintain the selected intake pressure with wide open throttle at a medium altitude which, for example, may be 6000 feet for a high pressure selection and 12,000 feet for a low pressure selection. Hence, it is not desirable that the turbine speed fall below 8000. Therefore, by the closing of the contacts 240 and 241 of the centrifugal device and by the closing of contacts 172 and 173 of the transfer relay a connection with the blade 139 of variable contact switch 140 is effected. In other words, the switch 140 comes under the control of the centrifugal device to prevent the speed of the turbine falling below minimum speed. If the speed of the turbine tends to fall below the minimum speed the intake manifold pressure would begin to decrease with the result that the bellows 122 of the device 120 would tend to collapse to cause the blade 139 to engage only the segment 146r of the switch 140. This would cause relay 90 to operate to cause the motor 80 to close the waste gate 30 to raise the turbine speed. As the turbine speed increases, the intake pressure is increased so that bellows 122 expands to cause the blade 139 to move to mid-position whereupon rotation of the motor 80 in a direction to close the waste gate 30 ceases. If the idling speed of the turbine becomes too high while contacts 240 and 241 are closed, the blade 139 will move into engagement only with the left segment 146l, and relay 100 will be operative to cause the motor 80 to operate in a direction to open the waste gate so that turbine speed will decrease.

When that altitude is reached which is critical for a selected pressure with minimum speed operation of the turbine, the throttle 31 being wide open, then the control by the centrifugal device is removed and the switch 140 is controlled only by the pressure responsive device 120 which is set to maintain a certain pressure. Since the pressure cannot be maintained above the critical altitude without materially increasing the speed of the turbine, upon the closing of contacts 177, 178 its speed is allowed to increase from about 8000 up to 24,000 R. P. M. At 9000 R. P. M. the pin 228 of the centrifugal device moves down sufficiently to cause lever 230 to move arm 237 clockwise in order to bring the center line of action of spring 224 below the pivot 238 whereupon the arm 239 is quickly moved against the stop 239a and the contact 240 is quickly separated from the contact 241. Then coil 167 of transfer relay 165 is deenergized and the reengagement of contacts 170 and 171 takes place. Then the circuit to the arm 139 of the variable contact switch is solely through the contacts 177 and 178. As the speed approaches 24,000 R. P. M., the pin 229 begins to move the arm 231 downwardly and away from a stop 231a against which it is urged by the spring 235. As the arm 231 moves down its non-conducting fork 250 moves downwardly and causes an arm 251 (pivoted at 252) to move the center line of action of a spring 253 (connecting arm 251 with arm 254) to move below the pivot 252, thereby causing arm 254 to move quickly away from a stop 255 and to move a contact 256 into engagement with a contact 257 connected with wire 112. This occurs at maximum governed speed which is 24,000 R. P. M. for example. When this occurs, a circuit is made from wire 112 to contacts 257, 256 arm 254, pivot 252 and wire 258 to coil 168 of relay 165. Relay 165 is again energized and the circuit to the variable contact switch 140 is interrupted by the separation of contact 170 from contact 171. Therefore the variable contact switch 140 no longer has any control of the motor 80. Therefore the motor 80 is no longer under the control of the pressure responsive device 120. The motor 80 is now directly under the control of the centrifugal device for maximum speed control. This is effected by the closing of contacts 256 and 257 which causes a relay coil 260 surrounding core 102 of relay 100 to be connected with the battery. Relay 100 operates to cause the motor 80 to open the waste gate 30, thereby causing the turbine speed to decrease. Therefore the speed cannot exceed a predetermined maximum, for example, 24,000

R. P. M. As the speed decreases, the contacts 256 and 257 remain in engagement until the speed has fallen to 22,000 R. P. M., for example. Then the coil 260 of relay 190 and the magnet coil 168 of relay 165 is deenergized and the control of the motor is transferred from the centrifugal device back to the variably-intermittent-contact switch 140 and the pressure responsive device 120.

*Résumé of operation.*—As the plane ascends from ground level, the supercharger 26 operates at a minimum speed which is sufficient, up to medium altitudes, to maintain the intake pressure which is selected by moving the control lever 40. The regulator 71 automatically increases the opening of the throttle valve 31 as the altitude increases in order that the selected pressure will be maintained. Until the throttle valve 31 has been fully opened, by the regulator, the speed of the supercharger remains at the minimum. When the throttle has been fully opened, the switch contacts 177, 178 close and the control of the waste gate motor 80 passes from the minimum speed control to a control responding to a demand for more pressure than that available with wide open throttle and the supercharger operating at minimum speed. Thereafter the waste gate motor 80 is controlled solely in response to intake pressure and functions to close the waste-gate and to increase the speed of the supercharger as the altitude increases above that altitude which was attained when the throttle valve carried at wide open position. Thus, the selected pressure which was maintained by automatically opening the throttle valve, while the turbine operated at minimum speed, is still maintained after the full opening of the throttle by increasing the turbine speed automatically. When the maximum turbine speed is attained, the control of the motor passes from the pressure responsive control to a speed responsive control and the waste gate is moved toward open position to prevent overspeeding. Conversely during descent, the turbine speed starts decreasing below the maximum governed speed and the maximum speed governor surrenders control to the pressure responsive means. As altitude decreases, the turbine speed decreases to the minimum speed and is held at the minimum speed by the minimum speed governor; and thereafter, the regulator 71 operates to close the throttle valve, so that the intake pressure will not exceed the selected value.

While the embodiment of the present invention as herein disclosed, constitutes a preferred form, it is to be understood that other forms might be adopted, all coming within the scope of the claims which follow.

What is claimed is as follows:

1. A system of control for supercharged engines comprising a throttle valve, a supercharger, means for driving the supercharger, means for varying the speed of the supercharger driving means, a servo-motor for operating the speed varying means, means under the control of engine intake pressure for controlling the servo-motor, speed responsive means for rendering effective the servo-motor control means to maintain the speed of the supercharger at least at a predetermined minimum in order that pressure is available to maintain a selected pressure during flight in a lower altitude range, a throttle valve regulator responsive to intake pressure for so positioning the valve that a selected pressure will be maintained with minimum speed operation of the supercharger until the altitude requiring wide open throttle is exceeded, means responsive to the wide-opening of the throttle for rendering the servo-motor control means effective to increase supercharger speed above the minimum as the altitude increases above the altitude requiring wide open throttle whereby a selected pressure is maintained during flight in a higher altitude range, and means for selecting the pressure to be maintained by operation of the throttle valve regulator and by operation of the servo-motor control means.

2. A system of control for supercharged engines comprising a throttle valve, a supercharger, means for driving the supercharger, means for varying the speed of the supercharger driving means, a servo-motor for operating the speed varying means, means under the control of engine intake pressure for controlling the servo-motor, speed responsive means for rendering effective the servo-motor control means to maintain the speed of the supercharger at least at a predetermined minimum, in order that pressure is available to maintain a selected pressure during flight in a lower altitude range, a throttle valve regulator responsive to intake-pressure for so positioning the valve that a selected pressure will be maintained with minimum speed operation of the supercharger until the altitude requiring wide open throttle is exceeded, means responsive to the wide-opening of the throttle for rendering the servo-motor control means effective to increase supercharger speed above the minimum as the altitude increases above the altitude requiring wide open throttle whereby a selected pressure is maintained during flight in a higher altitude range, means for selecting the pressure to be maintained by operation of the throttle valve regulator and by operation of the servo-motor control means, and means for limiting the speed of the supercharger to a predetermined maximum.

3. A system of control for supercharged engines comprising a throttle valve, a supercharger, an engine exhaust driven turbine for driving the supercharger, a waste-gate for controlling speed of the turbine, a servo-motor for operating the waste gate, means under the control of engine intake pressure for controlling the servo-motor, speed responsive means for rendering effective the servo-motor control means to maintain the speed of the supercharger at least at a predetermined minimum in order that pressure is available to maintain a selected pressure during flight in a lower altitude range, a throttle valve regulator responsive to intake pressure for so positioning the valve that a selected pressure will be maintained with minimum speed operation of the supercharger until the altitude requiring wide open throttle is exceeded, means responsive to the wide-opening of the throttle for rendering the servo-motor control means effective to increase supercharger speed above the minimum as the altitude increases above the altitude requiring wide open throttle whereby a selected pressure is maintained during flight in a higher altitude range, and means for selecting the pressure to be maintained by operation of the throttle valve regulator and by operation of the servo-motor control means.

4. A system of control for supercharged engines comprising a throttle valve, a supercharger, an engine exhaust driven turbine for driving the supercharger, a waste-gate for controlling speed of the turbine, a servo-motor for operating the waste gate, means under the control of engine intake pressure for controlling the servo-motor speed responsive means for rendering effective the servo-motor control means to maintain the speed of the supercharger at least at a predetermined minimum, in order that pressure is available to maintain a selected pressure during flight in a lower altitude range, a throttle valve regulator responsive to intake-pressure for so positioning the valve that a selected pressure will be maintained with minimum speed operation of the supercharger until the altitude requiring wide open throttle is exceeded, means responsive to the wide-opening of the throttle for rendering the servo-motor control means effective to increase supercharger speed above the minimum as the altitude increases above the altitude requiring wide open throttle whereby a selected pressure is maintained during flight in a higher altitude range, means for selecting the pressure to be maintained by operation of the throttle valve regulator and by operation of the servo-motor control means, and means for limiting the speed of the supercharger to a predetermined maximum.

5. A system of control for supercharged engines comprising a throttle valve, a supercharger, an engine exhaust driven turbine for driving the supercharger, a waste-gate for controlling speed of the turbine, a reversible electric servo-motor for operating the waste gate, means under the control of engine intake pressure for controlling the servo-motor, speed responsive means for rendering effective the servo-motor control means to maintain the speed of the supercharger at least at a predetermined minimum in order that pressure is available to maintain a selected pressure during flight in a lower altitude range, a throttle valve regulator responsive to intake pressure for so positioning the valve that a selected pressure will be maintained with minimum speed operation of the supercharger until the altitude requiring wide open throttle is exceeded, means responsive to the wide opening of the throttle for rendering the servo-motor control means effective to increase supercharger speed above the minimum as the altitude increases above the altitude requiring wide open throttle whereby a selected pressure is maintained during flight in a higher altitude range, and means for selecting the pressure to be maintained by operation of the throttle valve regulator and by operation of the servo-motor control means.

6. A system of control for supercharged engines comprising a throttle valve, a supercharger, an engine exhaust driven turbine for driving the supercharger, a waste-gate for controlling speed of the turbine, a reversible electric servo-motor for operating the waste gate, means under the control of engine intake pressure for controlling the servo-motor, speed responsive means for rendering effective the servo-motor control means to maintain the speed of the supercharger at least at a predetermined minimum in order that pressure is available to maintain a selected pressure during flight in a lower altitude range, a throttle valve regulator responsive to intake-pressure for so positioning the valve that a selected pressure will be maintained with minimum speed operation of the supercharger until the altitude requiring wide open throttle is exceeded, means responsive to the wide-opening of the throttle for rendering the servo-motor control means effective to increase supercharger speed above the minimum as the altitude increases above the altitude requiring wide open throttle whereby a selected pressure is maintained during flight in a higher altitude range, means for selecting the pressure to be maintained by operation of the throttle valve regulator and by operation of the servo-motor control means, and means for limiting the speed of the supercharger to a predetermined maximum.

7. A system of control for supercharged engines comprising a throttle valve, a supercharger, an engine exhaust driven turbine for driving the supercharger, a waste-gate for controlling speed of the turbine, a reversible electric servo-motor for operating the waste-gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a switch responsive to a certain minimum speed of the turbine for connecting the current source and third contact of the two-way switch, a throttle valve regulator responsive to intake pressure for so positioning the valve that a selected pressure will be maintained with minimum speed operation of the supercharger until the altitude requiring wide open throttle is exceeded, a switch responsive to the wide-opening of the throttle for connecting the current source and third contact of the two-way switch, thereby rendering the motor operable to close the waste gate to increase turbine speed above the minimum as the altitude increases above the altitude requiring wide open throttle whereby a selected pressure is maintained during flight in the higher altitude range and means for selecting the pressure to be maintained by operation of the throttle valve regulator and by operation of said third-contact-adjusting means.

8. A system of control for supercharged engines comprising a throttle valve, a supercharger, an engine exhaust driven turbine for driving the supercharger, a waste-gate for controlling speed of the turbine, a reversible electric servo-motor for operating the waste-gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a switch responsive to a certain minimum speed of the turbine for connecting the current source and third contact of the two-way switch, a throttle valve regulator responsive to intake pressure for so positioning the valve that a selected pressure will be maintained with minimum speed operation of the supercharger until the altitude requiring wide open throttle is exceeded, a switch responsive to the wide-opening of the throttle for connecting the current source and third contact of the two-way switch, thereby rendering the motor operable to close the waste gate to increase turbine speed above the minimum as the altitude increases above the altitude requiring wide open throttle whereby a selected pressure is maintained during flight in the higher altitude range and means for selecting the pressure to be maintained by operation of the throttle valve regulator and by operation of said third-contact-adjusting means, and means responsive to the attainment of a certain maximum turbine speed for effecting the operation of that relay which effects operation of the motor in the direction for opening the waste gate.

9. A system of control for supercharged engines comprising a throttle valve, a supercharger, an engine exhaust driven turbine for driving the supercharger, a waste-gate for controlling speed of the turbine, a reversible electric servomotor for operating the waste-gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a switch responsive to a certain minimum speed of the turbine for connecting the current source and third contact of the two-way switch, a throttle valve regulator responsive to intake pressure for so positioning the valve that a selected pressure will be maintained with minimum speed operation of the supercharger until the altitude requiring wide open throttle is exceeded, a switch responsive to the wide-opening of the throttle for connecting the current source and third contact of the two-way switch, thereby rendering the motor operable to close the waste gate to increase turbine speed above the minimum as the altitude increases above the altitude requiring wide open throttle whereby a selected pressure is maintained during flight in the higher altitude range, means for selecting the pressure to be maintained by operation of the throttle valve regulator and by operation of said third-contact-adjusting means, an auxiliary magnet coil provided by that relay which effects operation of the motor in the direction for opening the waste gate, and a switch responsive to the attainment of a certain maximum turbine speed for connecting said auxiliary magnet coil with the current source.

10. A system of control for supercharged engines comprising a throttle valve, a supercharger, an engine exhaust driven turbine for driving the supercharger, a waste-gate for controlling speed of the turbine, a reversible electric servomotor for operating the waste gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a transfer relay having two fixed contacts and a movable switch contact normally engaging one of the fixed contacts and movable out of engagement therewith and into engagement with the other fixed contact by magnetic attraction, said transfer relay having a magnet coil, a switch closed in response to a certain minimum speed of the turbine for connecting the current source and magnet coil of the transfer relay, a circuit completed thereby between the current source and the third contact of the intake-pressure-responsive two-way switch, said circuit including the magnetically closed contacts of the transfer relay and said contact closed in response to a minimum speed of the turbine, a throttle valve regulator responsive to intake pressure for so positioning the valve that a selected pressure will be maintained with minimum speed operation of the supercharger until the altitude requiring wide open throttle is exceeded, a switch closed in response to the wide-opening of the throttle for establishing a circuit including the normally engaged contacts of the transfer relay between the current source and third contact of the intake-pressure-responsive switch, thereby rendering the motor operable to close the waste gate to increase turbine speed above the minimum as the altitude increases above the altitude requiring wide open throttle whereby a selected pressure is maintained during flight in the higher altitude range and means for selecting the pressure to be maintained by operation of the throttle valve regulator and by operation of said third-contact-adjusting means.

11. A system of control for supercharged engines comprising a throttle valve, a supercharger, an engine exhaust driven turbine for driving the supercharger, a waste-gate for controlling speed of the turbine, a reversible electric servomotor for operating the waste gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a transfer relay having two fixed contacts and a movable switch contact normally engaging one of the fixed contacts and movable out of engagement therewith and into engagement with the other fixed contact by magnetic attraction, said transfer relay having a magnet coil, a switch closed in response to a certain minimum speed of the turbine for connecting the current source and magnet coil of the transfer relay, a circuit completed thereby between the current source and the third contact of the intake-pressure-responsive two-way switch, said circuit including the magnetically closed contacts of the transfer relay and said contact closed in response to a minimum speed of the turbine, a throttle valve regulator responsive to intake pressure for so positioning the valve that a selected pressure will be maintained with minimum speed operation of the supercharger until the altitude requiring wide open throttle is exceeded, a switch closed in response to the wide-opening of the throttle for establishing a circuit including the normally engaged contacts of the transfer relay between the current source and third contact of the intake-pressure-responsive switch, thereby rendering the motor operable to close the waste gate to increase turbine speed above the minimum as the altitude increases above the altitude requiring wide open throttle whereby a selected pressure is maintained during flight in the higher altitude range, means for selecting the pressure to be maintained by operation of the throttle valve regulator and by operation of said third-contact-adjusting means, and means responsive to the attainment of a certain maximum turbine speed for effecting the operation of that relay which effects operation of the motor in the direction for opening the waste gate and for effecting operation of the transfer relay to open its normally closed contacts and to close its normally open contacts.

12. A system of control for supercharged engines comprising a throttle valve, a supercharger, an engine exhaust driven turbine for driving the supercharger, a waste-gate for controlling speed of the turbine, a reversible electric servo-motor for operating the waste gate, a current source, motor circuits respectively operative to connect the motor and source for operation of the motor in opposite directions, relays respectively operative to control the motor circuits, each relay having a magnet coil, a two-way switch having two contacts connected respectively with the relay magnet coils and a third contact movable relative to the other two contacts, engine-intake-pressure-responsive means for adjusting the third contact, a transfer relay having two fixed contacts and a movable switch contact normally engaging one of the fixed contacts and movable out of engagement therewith and into engagement with the other fixed contact by magnetic attraction, said transfer relay having a magnet coil, a switch closed in response to a certain minimum speed of the turbine for connecting the current source and magnet coil of the transfer relay, a circuit completed thereby between the current source and the third contact of the intake-pressure-responsive two-way switch, said circuit including the magnetically closed contacts of the transfer relay and said contact closed in response to a minimum speed of the turbine, a throttle valve regulator responsive to intake pressure for so positioning the valve that a selected pressure will be maintained with minimum speed operation of the supercharger until the altitude requiring wide open throttle is exceeded, a switch closed in response to the wide-opening of the throttle for establishing a circuit including the normally engaged contacts of the transfer relay between the current source and third contact of the intake-pressure-responsive switch, thereby rendering the motor operable to close the waste gate to increase turbine speed above the minimum as the altitude increases above the altitude requiring wide open throttle whereby a selected pressure is maintained during flight in the higher altitude range, means for selecting the pressure to be maintained by operation of the throttle valve regulator and by operation of said third-contact-adjusting means, an auxiliary magnet coil provided by that relay which effects operation of the motor in the direction for opening the waste gate, an auxiliary magnet coil provided by the transfer relay to effect, when energized, the opening of the normally closed contacts of the transfer relay and the closing of its normally open contacts, and a switch closed in response to the attainment of a certain maximum turbine speed for connecting both said auxiliary magnet coils with the current source.

13. A system of control for supercharged engines comprising a supercharger, a supercharger-driver, a speed controller for the supercharger-driver, a servo-motor for operating the speed controller, a manually adjusted pressure selecting element, an element responsive to intake pressure, and means under the control of both said elements for causing the servo motor to be non-operative when the intake pressure equals the selected pressure and for causing the servo-motor to operate to increase supercharger speed when the intake-pressure is less than the selected pressure and for causing the servo-motor to operate to decrease supercharger speed when the intake pressure is greater than the selected pressure, said means including provisions for causing the rate of accumulation of motion of the servo-motor to diminish as the motor operates to correct the supercharger speed, and means responsive to an abrupt increase in selected pressure, and operative independently of the magnitude thereof, for causing a momentary maximum rate of accumulation of motion as it operates initially to effect and increase the supercharger speed.

14. A system of control for supercharged engines comprising a supercharger, a supercharger-driver, a speed controller for the supercharger-driver, a servo-motor for operating the speed controller, a manually adjusted pressure selecting element, an element responsive to intake pressure, and means for controlling the servo-motor and including apparatuses for effecting operation of the servo-motor respectively in opposite directions and a member for controlling said apparatus and positioned by both of said elements in a central or neutral position causing non-effectiveness of the apparatuses when the intake pressure equals the selected pressure and causing effectiveness of that apparatus which effects operation of the servo-motor to increase supercharger speed when the intake pressure is less than the selected pressure and causing effectiveness of that apparatus which effects operation of the servo-motor to decrease supercharger speed when the intake pressure is greater than the selected pressure, the distance of the control member away from neutral position varying in magnitude according to the magnitude of the difference between selected pressure and intake pressure, and said apparatuses having provisions for causing the rate of accumulation of motion of the motor to diminish as the control member approaches neutral position, and means responsive to an abrupt increase in selected pressure, and operable independently of the magnitude thereof, for causing a momentary maximum rate of accumulation of motion of the motor as it operates initially to effect an increase of supercharger speed.

15. A system of control for supercharged engines comprising a supercharger, a supercharger-driver, a speed controller for the supercharger-driver, a reversible electric servo-motor for operating the speed controller, a manually adjusted pressure selecting element, an element responsive to intake-pressure, motor operating circuits for causing the motor to operate respectively in opposite directions, means for controlling the electric motor and including apparatuses respectively operative for controlling the motor operating circuits and a member for controlling said apparatuses and positioned by both of said elements in a central or neutral position causing non-effectiveness of the apparatuses when the intake pressure equals the selected pressure and causing effectiveness of that apparatus which effects operation of the motor in a direction to increase supercharger speed when the intake pressure is less than the selected pressure and causing effectiveness of that apparatus which effects operation of the motor in a direction to decrease supercharger speed when the intake pressure is greater than the selected pressure, the distance of the control member away from neutral position varying in magnitude according to the magnitude of the difference between selected pressure and intake pressure, and said apparatuses having provisions responsive to movement of said control member for causing the rate of accumulation of motion of the motor to diminish as the control member approaches neutral position.

16. A system of control for supercharged engines comprising a supercharger, a supercharger-driver, a speed controller for the supercharger-driver, a reversible electric servo-motor for operating the speed controller, a manually adjusted pressure selecting element, an element responsive to intake-pressure, motor operating circuits for causing the motor to operate respectively in opposite directions, means for controlling the electric motor and including apparatuses respectively operative for controlling the motor operating circuits and a member for controlling said apparatuses and positioned by both of said elements in a central or neutral position causing non-effectiveness of the apparatuses when the intake pressure equals the selected pressure and causing effectiveness of that apparatus which effects operation of the motor in a direction to increase supercharger speed when the intake pressure is less than the selected pressure and causing effectiveness of that apparatus which effects operation of the motor in a direction to decrease supercharger speed when the intake pressure is greater than the selected pressure, the distance of the control member away from neutral position varying in magnitude according to the magnitude of the difference between selected pressure and intake pressure, and said apparatuses having provisions responsive to movement of said control member for causing the rate of accumulation of motion of the motor to diminish as the control member approaches neutral position, and means responsive to an abrupt increase in selected pressure and operable independently of the magnitude thereof for causing a momentary, maximum rate of accumulation of motion of the motor as it operates initially to increase the supercharger speed.

CLARENCE H. JORGENSEN.
EDWARD M. CLAYTOR.